United States Patent [19]
Righi

[11] 3,744,328
[45] July 10, 1973

[54] DRIVE MECHANISM FOR PORTABLE RECORD PLAYERS

[76] Inventor: Nardino Righi, Via Maniago, 2, Milan, Italy

[22] Filed: Sept. 14, 1970

[21] Appl. No.: 71,657

[30] Foreign Application Priority Data

Feb. 27, 1970 Italy..........................20990 B/70

[52] U.S. Cl.....................................................74/209
[51] Int. Cl...............................................F16h 13/02
[58] Field of Search.........................74/209, 206, 208

[56] References Cited

UNITED STATES PATENTS

| | | | |
|---|---|---|---|
| 2,647,408 | 8/1953 | Manning | 74/206 |
| 2,161,148 | 6/1939 | Erwood | 74/206 |
| 2,261,889 | 11/1941 | Schneider | 74/209 X |
| 2,386,503 | 10/1945 | Pressley | 248/18 |
| 2,583,954 | 1/1952 | Kugler | 74/209 X |
| 2,615,342 | 10/1952 | Mullaney | 74/209 X |
| 2,711,104 | 6/1955 | Shields | 74/209 X |
| 2,786,559 | 3/1957 | Sherwood | 74/209 X |

*Primary Examiner*—Leonard H. Gerin
*Attorney*—Charles E. Temko

[57] ABSTRACT

A device to maintain constant the speed of rotation of the turntable of a portable record player, consisting of a rotating disc or flywheel pressing against the circumference of the turntable, the flywheel being pivotted on the end of a moveable arm which is subject to the pressure of a flexible device which forces the above-mentioned flywheel against the turntable.

The flywheel is driven, through a transmission, by the appropriate motor of the record player.

3 Claims, 2 Drawing Figures

NARDINO RIGHI

INVENTOR

BY Charles E. Tonke

ATTORNEY

DRIVE MECHANISM FOR PORTABLE RECORD PLAYERS

This invention concerns a drive mechanism for record player turntables in general and for portable record players in particular. The mechanism is fitted with a flywheel which has the function of maintaining constant the speed of rotation of the turntable when the record player is accidentally knocked or when it is used in motion.

As is well known, record players actually available on the market do not permit satisfactory sound reproduction when travelling because shocks and accidental knocks received by the record player cause variations in the speed of rotation of the turntable and consequently changes in the sound reproduction of the record being played.

The scope therefore of the model here described is to supply a new drive train, for portable record players, which permits automatic compensation for accidental variations in the speed of rotation of turntables by means of a flywheel system such as to absorb from or give out to the turntable energy to maintain constant its speed of rotation.

The drive train in this invention consists in essentials of a flywheel pivotting on the end of a moveable arm which is subject to the constant pressure of a flexible device which maintains a friction shaft of the flywheel constantly in contact with the edge of the turntable, the flywheel being driven in the opposite direction to that of the rotation of the turntable by the record player's electric motor.

Figure 2:
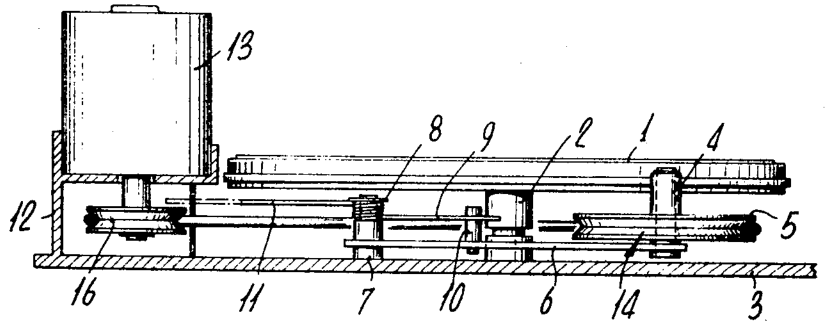
Figure 1:
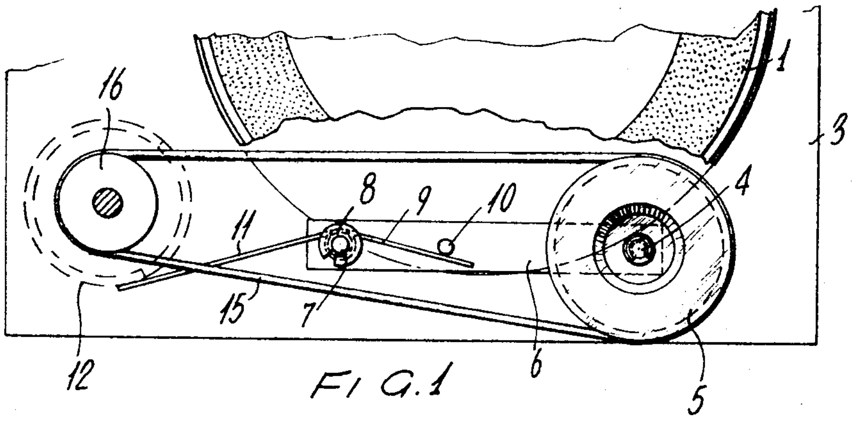

The drive mechanism of this invention will now be described in greater detail, reference being made to the attached drawing, in which:

FIG. 1 is a view from above of a typical portable record player showing the drive train which forms the invention, and FIG. 2 shows a side view, partly in section, of FIG. 1.

Referring to the drawing it can be seen that the turntable 1, pivotting at 2 on a base 3, or on the lower part of the case of a typical record player, has its edge directly in contact with a friction drive shaft 4, co-axial with and rigidly fixed to a rotating disc or flywheel 5 of appropriate mass, underneath and to one side of turntable 1. The flywheel 5 journals in one end of a moveable arm 6.

The moveable arm 6 is in turn pivotted at one end on a shaft 7, rigidly fixed to the above-mentioned base 3, and can move parallel to the plane of turntable 1, to cause the flywheel 5 to approach or move away the edge of the turntable itself. A spiral spring 8 or other similar device attached to the above-mentioned shaft 7, has one arm 9 pressing against a peg or a proud section of the moveable arm 6, and a second arm pressing against a fixed element on base 3—a support for example of the electric motor which, suitably supplied with electric current, drives the record player. The above-mentioned spring 8 supplies pressure to continually force the moveable arm 6 in the direction of the turntable 1, and so to maintain the friction drive shaft 4 of the flywheel permanently in contact with the edge of the turntable.

As can be seen in FIG. 2, the flywheel 5 has a groove 14, in which one end of a drive belt 15 moves, whose other end turns in pulley 16, mounted on the shaft of motor 13, mentioned above. In this way motor 13 causes the movement in one direction of flywheel 5 which in turn, through friction drive shaft 4, rotates turntable 1 in the opposite direction.

From all this it follows that if the mass of flywheel 5 has been correctly calculated in relation to the mass of the turntable 1, taking account also of the weight of the record if necessary, and bearing in mind the high speed of rotation of the flywheel 5 in relation to that of the turntable 1, in the event of an accidental knock or a sharp movement of the record player tending to vary, for example to increase or decrease, the speed of rotation of turntable 1, this variation is automatically compensated for by the action of flywheel 5, which absorbs or gives up energy as the case may be to the turntable, maintaining effectively constant the latter's speed of rotation.

From what has already been said and described with reference to the attached designs, it will be understood that a drive mechanism for portable record players has been created which is of simple construction and extremely practical.

What is claimed is:

1. In a record player turntable construction, a record supporting turntable having an outer peripheral surface, a friction drive shaft contacting said peripheral surface and rotating in a direction opposite that of said turntable, a flywheel carried by said drive shaft and lying substantially in a plane parallel to the principal plane of said turntable, and means imparting rotational motion to said flywheel, whereby planar motion including either rotational or translational components accidentally imparted to said turntable construction tending to vary the speed of said turntable will be absorbed by said flywheel.

2. Structure in accordance with claim 1 in which the flywheel is pivoted on one end of a movable arm which is in turn pivoted at its other end to the base of the record player construction, the movable arm being constantly under the pressure of a flexible device which pushes the drive shaft against the turntable.

3. Structure in accordance with claim 1 in which the flywheel has a circumferential groove, said motion imparting means including a transmission belt engageable within said grove.

* * * * *